March 12, 1946. V. GREY 2,396,504
COLLET STOP ANCHOR
Filed Jan. 18, 1944 2 Sheets-Sheet 1

INVENTOR
VICTOR GREY
BY
ATTORNEY

March 12, 1946.                V. GREY                    2,396,504
                          COLLET STOP ANCHOR
                       Filed Jan. 18, 1944         2 Sheets-Sheet 2
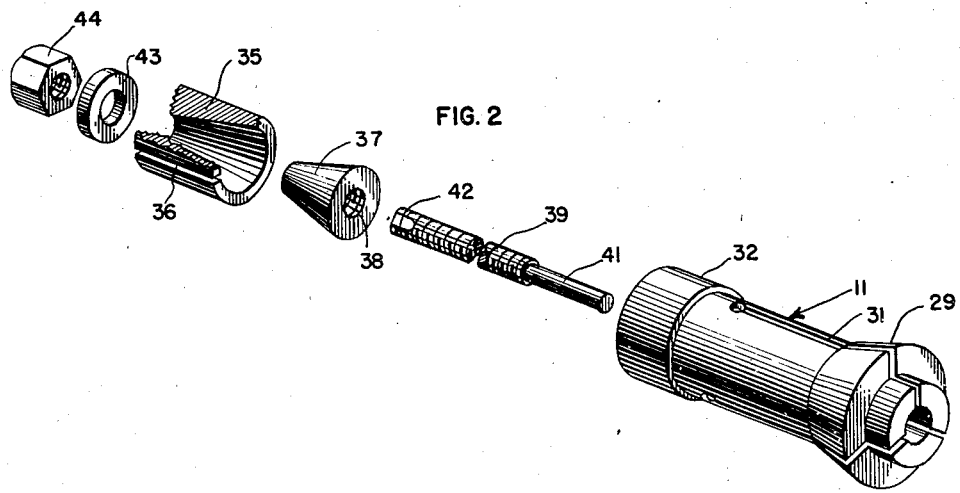
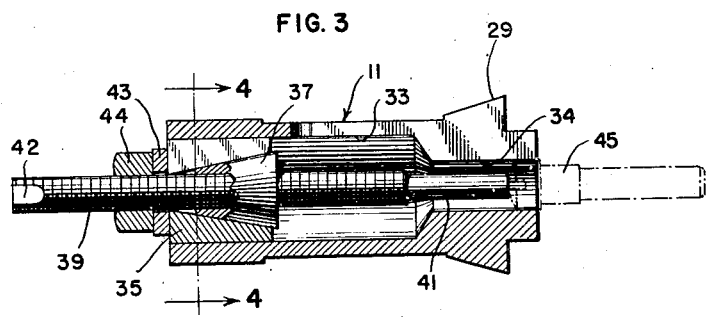
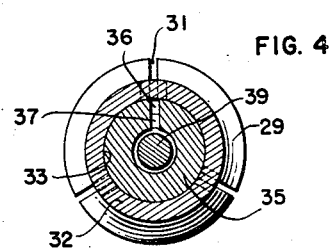
INVENTOR
VICTOR GREY
BY
ATTORNEY Patented Mar. 12, 1946

2,396,504

UNITED STATES PATENT OFFICE 2,396,504

COLLET STOP ANCHOR

Victor Grey, Chicago, Ill., assignor to Teletype Corporation, Chicago, Ill., a corporation of Delaware Application January 18, 1944, Serial No. 518,720

1 Claim. (Cl. 279—46)

The present invention relates to rotary spindle machine collets and more particularly to apparatus for adjustably limiting the throat depth of chuck collet devices.

In rotary spindle metal cutting machines such as automatic screw machines, there are customarily provided a set of various sized chucking collets which consist of longitudinally split jaw elements concentrically cammed so as to grip longitudinally fed stock material during intervals of successive machine processing operations and to be relaxed and permit the advancement of such stock during intervals between said operations. In accordance with established screw machine practice, such chucking collets are usually of identical external dimensions and have a standard internal principal bore, varying only in respect to the bore of the chuck jaws, a characteristic of the fore, or lip portion of the collet.

Under conventional usage, a rod of material is fed through a hollow rotary spindle of the machine and through the principal internal bore of the chucking collet; thence, through the chuck jaws thereof, which are spaced at a dimension slightly larger than the bar stock during the expanded condition of the collet and are constrictable so as to firmly secure the stock of material when the collet is operated by being compressed through a constricting ring that is thrust over a tapered or conical portion of such collet. The operation of the constricting ring is automatically controlled along with the operation of the various other portions of an automatic screw machine and, hence, apparatus of this class is particularly suited to production methods of manufacturing some classes of piece parts.

At times, however, products which may be partially manufactured in accordance with the aforedescribed conventional practices in conjunction with automatic screw machine devices require secondary operations in order to attain a degree of completion. Often these secondary operations are required to be performed, after the piece parts have been severed from the principal stock of material, and therefore, special placement means must be employed in order that each of the piece parts assume the same position with respect to the tools. That is to say, in contradistinction from the conventional practice of feeding out stock from a supply bar of extensive length where the end of the bar strikes a stop carried by the turret portion of the machine, the positioning of partially processed piece parts must be otherwise determined so that the piece parts may be similarly affected by the diverse tools which are thereafter brought in operation and this placement must be accurate to a high degree.

Accordingly, the principal object of the present invention is to provide an adjustable workstopping or limiting apparatus which may be incorporated universally among any one of a series of variable sized chuck collets and within them may be variably adjusted to determine accurately the extent of penetration of work into said collet during secondary operation processes.

Secondary operations are performed on piece parts that are inserted into the spindle chuck by manual placement or in some instances they may be inserted into a transferring device which thereafter places the piece parts into the principal machine. In the former case where piece parts are manually inserted into the chuck or collet, and where conventional collets are employed, means must be provided for preventing the piece part from being inserted too deep into the throat of the chuck. Otherwise, secondary operation tools will not engage all of the piece parts similarly. Towards this end, the instant invention proposes an automatically adjustable limit device which includes a universally adaptable binding member for effecting securement of said device within any one of a set of conventional chucking collets. The securement device is adapted to be held within the principal bore of the collet which, according to conventional practice, is of standard diameter for a given series of collets, or for the collets relating to any particular manufacture of screw machine.

Means are provided for adjusting the disposition of a limit post held by the clamping or camming device so that piece parts inserted manually, endwise of the collet, will be confined to a depth determined by their encounter with the abutment portion of such post.

In achieving the foregoing and other objects of this invention, the principal embodiment will be described which utilizes expansible binding means readily removable from the collet in order to permit each collet to be able to be employed in accordance with the conventional practice; that is, in continuous feed automatic screw machining processes and which means may be incorporated into conventional collet design without weakening or affecting deleteriously the structure of the collets as might be necessitated by drilling, cutting, or drawing of the steel temper in order to effect the installation of such means. The present invention utilizes a threaded axially disposed stop post including a fore portion of reduced diameter. A truncated conical wedge is fitted for screw threaded engagement with the post and its conical taper conforms angularly with an internal taper of an expansible cylinder which is longitudinally split and of a diameter so as to be snugly received during relaxation within the principal bore of a chuck collet. For effecting securement the cylinder is expanded within the collet which condition is achieved by forcing the threaded conical nut into the cylindrical member and drawing the former against a thrust washer thereby causing expansion of the cylindrical member within the girdle ring of the collet.

For adjustment, the draw nut is relaxed and the consequent receding of the expansible nut permits various arrangements or adjustments longitudinally. In addition to the adjustment afforded by the total body displacement of the assembly, the threaded post may be exactly regulated by rotation until its reduced abutment portion is disposed to properly engage work pieces upon their insertion into the gripping bore of the collet.

For a more comprehensive disclosure, reference will now be had to the accompanying drawings and to the following detailed specification in which like reference characters designate corresponding parts throughout and in which;

Fig. 2 is an exploded perspective view of elements featuring a preferred embodiment of the present invention after the manner disclosed in Fig. 1;

Fig. 3 is a longitudinal sectional view through the apparatus illustrated in Fig. 2 featuring the relative arrangement of the collet and limit device during assembly; and Fig. 4 is a transverse sectional view taken approximately on line 4—4 of Fig. 3.

Figure 1:
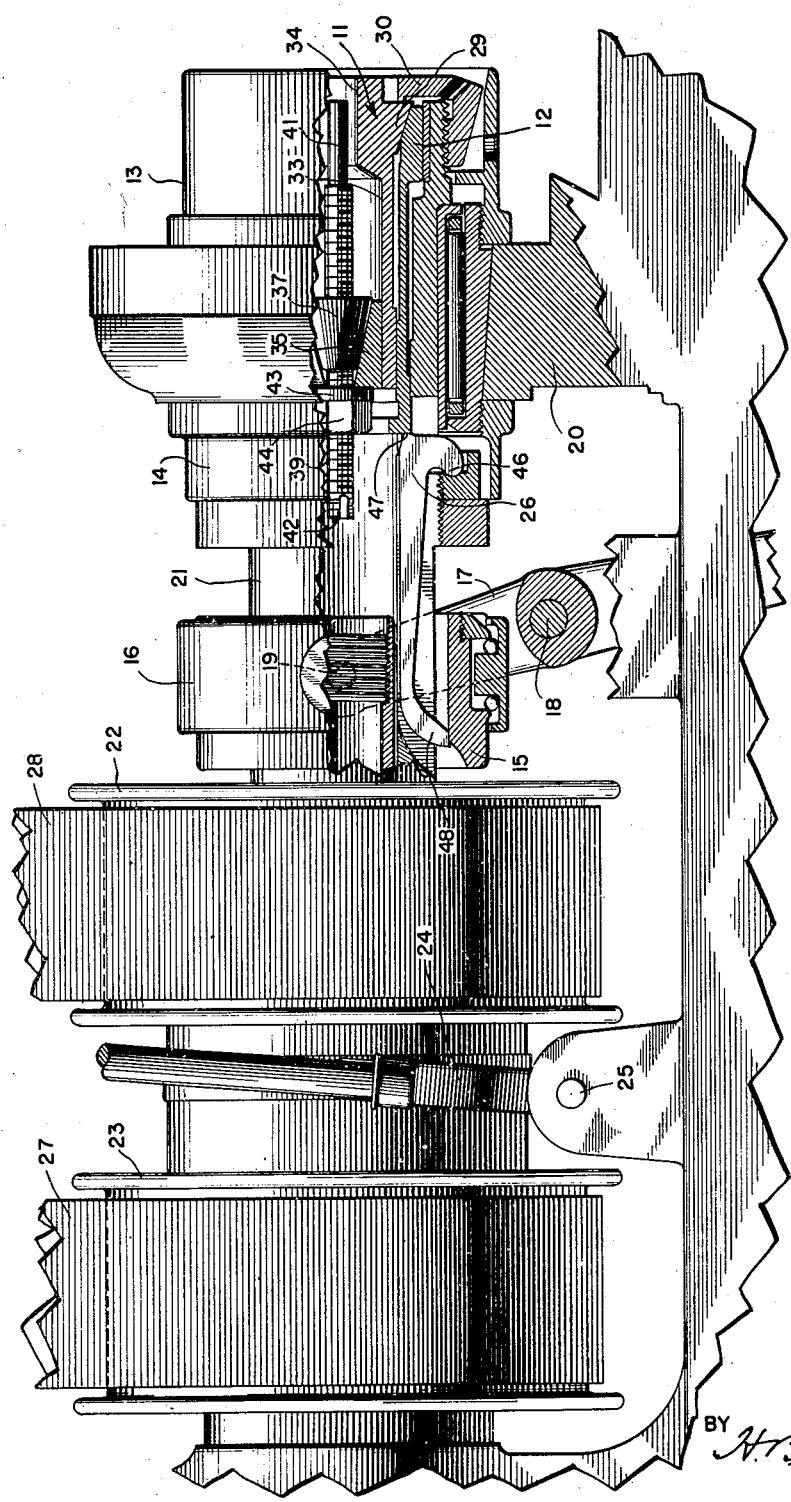
Fig. 1 is a side elevation partially in quarter-section of an automatic rotary spindle machining apparatus having applied thereto one embodiment of the present invention.

In the several illustrations, the reference numeral 11 designates a conventional type of chucking collet usually formed of an integral cylindrical steel body having a longitudinal cross-section such as that illustrated in Fig. 3 and adapted to be received within a sleeve member 12, Fig. 1, which affords snug, though free fitting engagement thereto. The sleeve 12 is itself mounted for free rotary movement within one of the base casting support pillars 20 in which a roller bearing raceway is securely held by the opposite retaining nuts 13 and 14 of which the front journal nut 13 is provided with a flared cylindrical flange which shelters the outermost extremities of a collet retaining nut 30.

The collet chuck comprises a principal body portion of slightly reduced cross-sectional diameter and with a fore portion that is conically tapered as at 29, Fig. 2, corresponding in contour with an internal taper formed in the sleeve 12, Fig. 1. The rear of the collet chuck is formed in a solid girdle ring 32 which has close fitting reception in a bore of sleeve 12 and which contrasts in this respect from the remaining portion of the collet that is longitudinally split by three radially equidistant slots 31. From this arrangement it may be noted that when sleeve 12 is urged rightwardly, the conical-tapered portion 29 of collet 11 becomes constricted and its internal chucking bore 34 is correspondingly reduced, causing to be gripped thereby any close fitting object placed within said bore.

Various means may be employed for constricting the collet. In accordance with the illustration in Fig. 1, one such means comprises two symmetrically opposite fulcrum thrust bars 26 disposed within longitudinal slots in the spindle shaft 21 and arranged so that their fulcrums 46 are retained within appropriate dished recesses in the back journal nut 14 and having the nodules 47 disposed so as to rest against the rearmost extremity of the sleeve 12.

The two fulcrum thrust bars are shaped as best indicated in Fig. 1 with their free extremities curved and flared outwardly as at 48, whereat the bars are controlled through the intervention of a throttle ring 15. When the ring 15 is maintained in its left position as illustrated in Fig. 1 the flared extremities 48 are confined inwardly causing the fulcrum bars 26 to be rotated about the fulcrum points 46 so as to project the nodules 47 rightwardly, thrusting the collet compressor sleeve 12 against the taper 29 of the collet and constricting the latter member to engage its work.

When the throttle ring 15 is moved rightwardly, the flared fulcrum rod portions 48 are thrown outwardly separating from one another as they leave the recesses of the spindle shaft 21 and rise to a limited extent so that nodules 47 will thereby be permitted to recede from the sleeve 12, effecting a relaxation of the afore-described compression effect upon the collet 11.

The throttle ring 15 has encircled about it a thimble 16 through which shifting of the throttle ring is controlled by means of a yoke 17 pivoted at 18 and pivoted at its forked extremities to the yoke trunnions 19 transversely in axial alignment with the center of shaft 21. The yoke 17 is shiftable about pivot 18 either manually or through automatic control usually depending upon the particular mode of operation of the principal machine. Upon being shifted rightwardly, thimble 16 and through it, throttle ring 15, are displaced and, accordingly, the flare extremities 48 of the fulcrum rod 26 are permitted to range outwardly, withdrawing the thrust nodules 47 as already explained.

Spindle 21 is given rotation in one direction or the other in accordance with the effectiveness of one or the other of an alternative pair of drive pulley wheels 22 and 23 carried in axial alignment with shaft 21 and provided with appropriate clutching mechanism so as to be alternatively effective in accordance with the disposition of the control lever 24 which is pivoted at 25 and which is shiftable so as to impart clockwise or counterclockwise rotation to the spindle shaft 21. Pulley wheel 22 is driven from a source of power by the belt 28 which source may also drive pulley wheel 23 through driving belt 27 but in a reverse direction; thus, alternative rotation is conventionally provided so that second operations upon the work 45, Fig. 3, may be achieved in either direction of rotation with the work pieces accurately placed within the collet chuck by the simple expedient of insertion until limited by the fore portion 41 of the stop screw 39.

When secondary operations upon a lot of piece parts have been completed and it is desired to dismantle the collet stop apparatus, the draw nut 44 is loosened by turning with respect to the threaded stop screw 39 which may be held rigid for this purpose by engaging its flattened cheeks 42 at the rear end thereof. This operation permits the conical nut 37 to recede from the wedge ring 35 so that the latter member becomes reduced circumferentially to a sufficient extent so that it may be withdrawn from within the collet bore 33. The principal collet bore 33 of all members of a set of collets is conventionally of the same diameter though said collets vary from each other in respect to the size of their respective chucking bores 34. This practice affords interchangeability of a single depth stop device described above among a complete set of collets while yet requiring no structural reformation of any of the collets from their principal design.

While the present invention has been described and illustrated with reference to a particularly contemplated embodiment, it is to be understood, nevertheless, that numerous changes and variations may be instituted without departing from the essential spirit or scope thereof. Accordingly, it is not intended to be limited by the details featured in the accompanying drawings nor by the language employed in the foregoing specification except as indicated in the hereunto appended claim.

The invention claimed is:

In a machine including a collet having a standard internal bore, a slidably adjustable stop for limiting the insertion of piece parts within said collet comprising in a unitary structure an element to be supported in the axial center of said collet, said element having a screw threaded section, a truncated cone screw threaded through its altitude to threadedly receive said threaded element, a cylindrical sleeve having a conical internal bore corresponding to said truncated cone and an external diameter corresponding to the collet bore, and a nut threaded on said element cooperating with said truncated cone, whereby when said nut is tightened after slidable adjustment pressure is applied to expand said cylindrical sleeve to bind it within the cylindrical bore of said collet and hold said unitary structure in adjusted position with respect to said collet.

VICTOR GREY.